United States Patent [19]

Sorg et al.

[11] Patent Number: 5,002,600
[45] Date of Patent: Mar. 26, 1991

[54] CONDUIT FOR MOLTEN GLASS

[75] Inventors: Helmut Sorg, Glattbach; Matjaz Bucar, Karsbach, both of Fed. Rep. of Germany

[73] Assignee: Beteiligungen Sorg GmbH & Co. KG, Lohr/Main, Fed. Rep. of Germany

[21] Appl. No.: 440,867

[22] Filed: Nov. 22, 1989

[30] Foreign Application Priority Data

Nov. 22, 1988 [DE] Fed. Rep. of Germany ....... 3839346

[51] Int. Cl.$^5$ ............................................. C03B 5/16
[52] U.S. Cl. ...................................... 65/346; 65/172; 65/337; 65/340
[58] Field of Search ................. 65/324, 172, 337, 340, 65/346, 356

[56] References Cited

U.S. PATENT DOCUMENTS 4,897,103 1/1990 Weilacher .............................. 65/346

Primary Examiner—Robert L. Lindsay
Attorney, Agent, or Firm—Felfe & Lynch

[57] ABSTRACT

A plurality of conduit segments contact on another which run vertically and transversely to the direction in which molten glass is channelled. Each segment includes at least one trough section and at least one cover section, an insulation of individual formed bodies, and an external casing. The segments are coupled together on support beams and may have removable insulation at joints to facilitate inspection.

10 Claims, 4 Drawing Sheets

CONDUIT FOR MOLTEN GLASS

BACKGROUND OF THE INVENTION

The invention relates to a glass conduit, particularly to be used as a feeder, a working tank and/or as a distributing conduit of a glass melting furnace. The glass conduit includes, successively from the interior toward the exterior, a trough chanelling the glass melt and a trough cover, each made of a fire-proof material, an insulation which includes several individual form bodies, an external casing which at least partially surrounds this insulation arrangement and a beam configuration which supports the glass conduit at least at its bottom and longitudinally.

So far, glass conduits of this kind have been erected as one piece and at the location of use, i.e. in the glassworks. Typically, the conduits have a length of approximately 10 to 15 m; also considering the heavy weight, it is impossible to transport the glass conduit. The beam configuration which supports the weight is generally erected as a so-called "steel boat" in which the insulating parts as well as the trough and the trough covering are manually incorporated. Depending on the size and length of the glass conduit the building time required amounts to approximately two weeks. When the glass conduit is defective or requires overhauling or repairing, the entire furnace must be shut down over a longer period of time. This involves loss of production which negatively affects the yield of the furnace operator. Another disadvantage with conventional glass melting conduits is that during tempering and operation of the conduit the joints of the trough can become leaky such that the melt flows into the insulation arrangement thus rendering the latter ineffective. This adversely affects the production since the molten glass is of a poorer quality and leads to faulty products. Since the glass conduit is configured as one piece, this leakage can often be detected only very late. It is very laborious and requires a time and labor intensive partial disassembling of the conduit to detect the leaking joint to be sealed again.

From U.S. Pat. No. 2,494,974 a glass furnace is known which includes two or more segments which are successively disposed in longitudinal direction. The individual segments differ from each other with respect to their insulating properties. This is accomplished for the individual parts of the furnace, the trough, through cover and external thermal insulation by employing different materials. With regard to the remaining properties, particularly in the mechanical-constructional design, this glass furnace corresponds to conventional constructions; hence, in this case, too, the entire furnace must be manually erected at the site of operation. Therefore, this known furnace also has the above stated disadvantages.

It is therefore an object of the invention to provide a glass conduit of the aforesaid kind which does not have these disadvantages and, in particular, can be repaired, assembled and disassembled more efficiently and also can be operated more safely.

SUMMARY OF THE INVENTION

The inventive glass conduit includes several conduit segments which basically join each other along planes of separation which run vertically and transversely to the longitudinal direction of the glass conduit, and can be braced against one another via coupling agents.

This segment design provides the possibility to prefabricate the conduit away from the site of operation in several units each of which can be transported. The prefabricated conduit segments must then only be transported to and assembled at the site of operation, e.g. a glassworks. The standstill times of glass melting furnaces, e.g. when the feeders must be replaced, are thus reduced to 1/10 of the original nonproductive time. The loss of production is reduced correspondingly and the operating results are improved. Moreover, in case repairing is required, the individual conduit segments can be replaced quickly and simply which also saves time and costs. An additional advantage is the improved compensation of expanding movements and the so caused mechanical strains in the glass conduit when the latter is tempered before charged with the glass melt. This improved compensation is achieved by the possibility to finally join and brace the conduit segments, which are relatively short as compared to the total length of the conduit, after completion of the tempering. Finally, it is an advantage of the new glass conduit that parts of the conduit segments can be reused since the segment design in accordance with the invention permits an at least partial standardization. The costs for parts and initial material are thus reduced.

DETAILED DESCRIPTION OF THE PREFERRED EMBODIMENT

Figure 1:
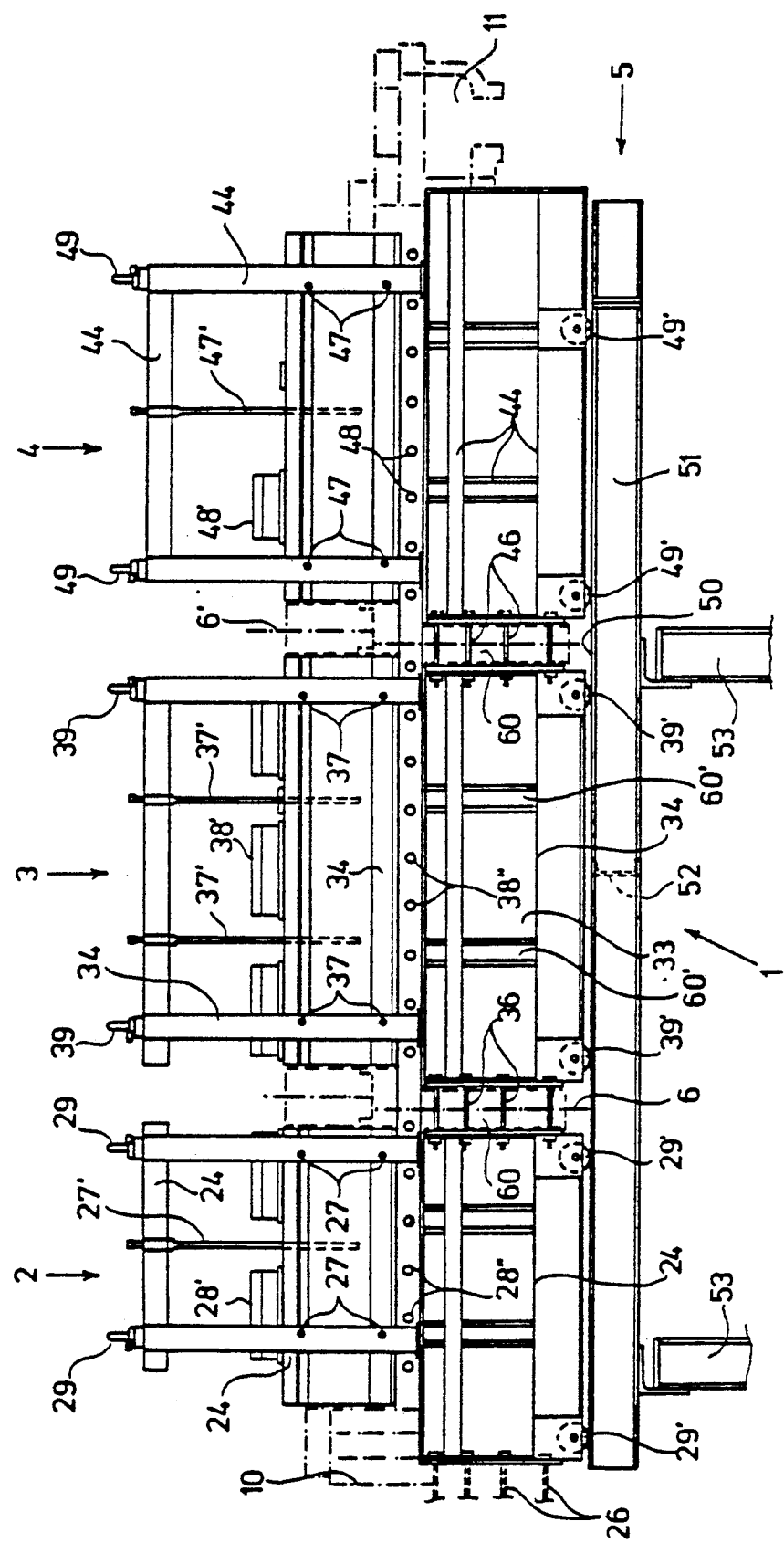
FIG. 1 is a side view of a glass conduit including several conduit segments.

Referring to FIG. 1, the glass conduit 1 includes a total of three conduit segments 2, 3 and 4 which are successively disposed on a common support beam configuration 5. The first conduit segment 2, i.e. the one on the left in FIG. 1, is configured as a connecting conduit segment to the glass discharge end of a glass melting furnace 10 which is indicated in the drawing only in outlines. The last conduit segment 4, i.e. the one on the right in FIG. 1, is at its free front side connected to or provided with a glass melt discharge 11 which is indicated by broken lines and connected to a glass working machine for manufacturing bottles or other glass objects.

In the vicinity of the separating planes 6, 6' which basically run vertically and transversely to the longitudinal direction of the glass conduit 1, the conduit segments 2 and 3, 3 and 4 are connected to one another at their front sides and braced by means of coupling agents, studs 36 and 46 in this case. Additional coupling agents 26, in this case also studs, serve to join the first conduit segment to the glass melting furnace 10.

All conduit segments 2, 3, and 4 have their own supporting frame construction 24, 34, and 44. The respective frames 24, 34 and 44 are each preferably made of a corner-, T-, U- or a double T-iron. The frames 24, 34, 44 contain the appertaining conduit segment 2, 3, 4, respectively, on the bottom, the top and longitudinally. In the interior of each segment a hollow space is configured for guiding the glass melt. On the bottom side, this space is formed by a trough and on the top side by a trough cover each of which are made of a fire-proof material. These parts are not visible in FIG. 1. Following this toward the exterior is an insulation which is not visible either. Inside the individual segments 2, 3, 4 these parts are supported in their position relatively to one another and with respect to the frame 24, 34, 44 by means of thrust bolts 27, 37, 47 and clamping bolts 27', 37', 47'. This ensures that even while transporting individual segments 2, 3, 4 that all parts of the segments 2, 3 ,4 remain in their given position even when relatively strong accelerating and shaking forces occur, as for example when transporting with a truck. The thrust bolts 27, 37 and 47 extend from the side in horizontal direction through the parts of the frames 24, 34, and 44 and, from the longitudinal sides of the segments 2, 3, 4 they press the intermediate parts against each other. The clamping bolts 27', 37' and 47', however, extend downwardly through the upper part of the frame 24, 34 and 44 and into the upper part of the insulation inside the respective segment 2, 3, 4. They serve particularly to protect the upper parts of the respective segment 2, 3, 4 against transportation damage. During operation of the glass conduit 1 these clamping bolts 27', 37' and 47' can be loosened or even totally removed.

Furthermore, FIG. 1 shows for each segment 2, 3, 4 at the upper end of the appertaining frame 24, 34, 44 several stopper ears 29, 39, 49, respectively. The latter serve to attach chains or ropes by means of which the respective segment 2, 3 or 4 can be lifted and moved using a crane.

The bottom of each of the segments 2, 3, 4 is provided with rollers 29', 39' and 49' which are disposed in pairs at the longitudinal sides of the segment 2, 3, 4 and rest on the support beam configuration 5. For this purpose, the support beam configuration is, on its top side, provided with a top rolling surface 50 on which the rollers 29', 39', 49' can move. On the one hand, this facilitates setting up the glass conduit since the individual segments 2, 3, 4 can be easily moved into the desired position and, on the other hand, this includes the possibility of a friction-free expanding when the glass conduit is tempered.

As already mentioned, the individual segments 2, 3 and 3, 4 contact one another in the vicinity of the front separating planes 6 and 6'. In this area, it is advantageous to first omit insulation and external cover during assembly in order to provide improved monitoring possibilities when the glass conduit is tempered. It is only after the tempering is completed that the segments 2 and 3, 3 and 4 are mechanically braced with respect to each other by means of the coupling agents 36 and 46 using the necessary tensile strength and insulated in the vicinity of the separating planes 6 and 6' by means of an insulating mass which is preferably tamped in. Cracks or enlargement of joints can hence hardly occur. For protection, the tamped-in insulating mass which annularly surrounds the area of the separating planes 6 and 6' is on its external side, in turn, enclosed by pressure plates 60. For inspection purposes of the joints in the area of the separating planes 6 and 6', the insulating material or the tamped-in insulating mass can relatively easily be removed again after removal of the trough plate 60 . Once the inspection and any necessary repairing, have been carried out, the insulating material can be applied and tamped in again.

Since the trough is also composed of several individual sections over the length of a segment 2, 3, 4, there are also trough joints within each of the segments 2, 3 ,4. In order to later have easy access to these joints, the external cover 33 is also in section as it can be seen from FIG. 1, and interrupted in the vicinity of the joints which are in each conduit segments 2, 3, 4. The insulation is also interrupted in the same way and later, particularly following the tempering of the glass conduit 1, it is filled to completion with tamped in insulating mass. This insulating mass is also covered with pressure plates 60' and secured in its position. Hence, all joints in the trough inside the glass conduit 1 remain easily accessible for later inspections and repair.

In order to permit a desired cooling of the glass melt flowing through the glass conduit 1, the segments 2, 3, 4 are provided on top with cooling apertures covered with a lid 28', 38' and 48' which can be moved or horizontally swung. Furthermore, in the transitional area between the bottom and the top, the individual segments 2, 3, 4 are provided with a number of lead-in openings 28", 38", 48" which serve to introduce burners, thermoelements or the like. The openings 28", 38" and 48" run in a basically horizontal direction and end in the inside of the glass conduit, preferably just above the level of the glass melt contained therein.

Due to its frame construction 24, 34 and 44, each of the segments 2, 3, 4 is self-supporting. The entire arrangement of the glass conduit 1, in this case including three conduit segments 2, 3, 4, however, is not self-supporting but is supported by the support beam arrangement 5 disposed below. The support beam arrangement 5 includes in the present case a pair of parallel longitudinal beams 51 of which only the front beam is visible in FIG. 1 due to the lateral point of view. There are spaced-apart stabilizing transverse beams 52 running between the two longitudinal beams 51. The support beam arrangement 5, in turn, rests on several posts 53 the bottom ends of which are supported, for example, in concrete and the top ends of which are provided with means to adjust the height of the support beam arrangement 5.

Figure 2:
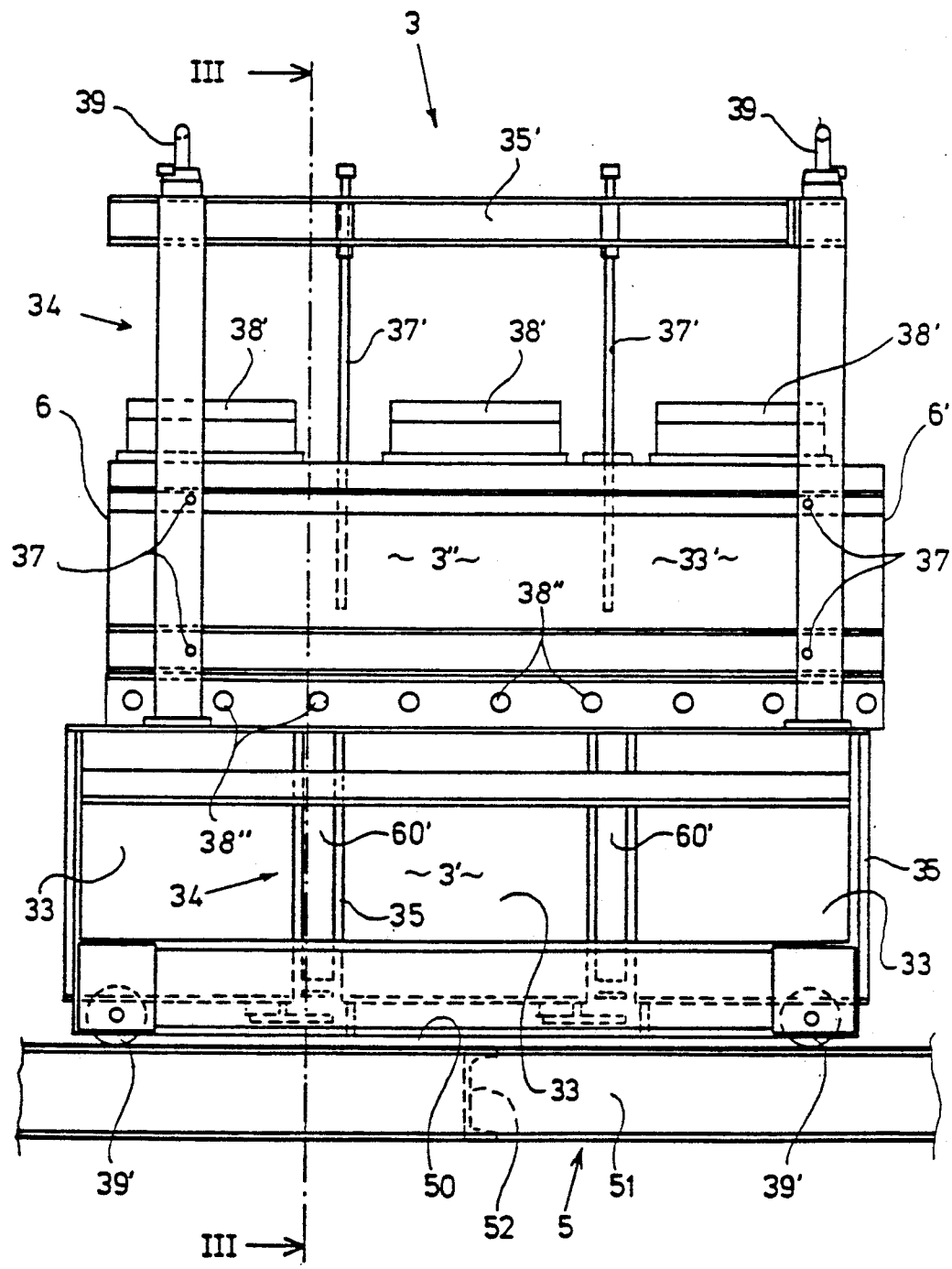
FIG. 2 is an enlarged and detailed representation of a conduit segment of FIG. 1, also a side view.

FIG. 2 of the drawing is an enlarged and detailed representation showing the structure of intermediate conduit segment 3, which includes a lower part 3' and an upper part 3" which are enclosed and supported by the common frame 34. The lower frame part 35 holds the trough which is in the interior of the segment 3 including the appertaining insulation and external casing 33 whereas the upper frame part 35' surrounds, longitudinally and on the top, the also non-visible trough cover including the appertaining insulation and external casing 33'. There are thrust bolts 37 at the longitudinal sides of the conduit segment 3 which are passed through the vertically running parts of the upper part 35' of the frame 34. The clamping bolts 37' are passed through a horizontally running beam of the upper part 35' of the frame and the bottom ends of these bolts extend into the insulation of the upper part 3" of the conduit segment 3.

The lower part 3' shows how the external casing 33 is divided into individual segments between each of which is disposed a pressure plate 60' for the tamped in and underlying insulating mass of the appertaining trough joint.

The lids 38' for the cooling apertures can be seen at the top of the upper part 3" of the conduit segment 3. The passages 38" in the center area of the longitudinal side of the conduit segment 3 in the transitional area between the upper part 3' and the upper part 3" are here visible again.

The stopper ears 39 are visible at the top end of the respective vertically running parts of the frame 34. The rollers 39' are visible at the bottom of the conduit segment 3 and partially covered by parts of the lower part 35 of the frame 34.

As FIG. 2 further clearly shows the front surfaces of the conduit segment 3 are not continuous but are configured to have a small projection and recess. An improved distribution and holding of the load is thus achieved in segments connected to each other. The support beam configuration is again visible below the conduit segment 3, in particular the longitudinal beam 51 thereof including the top rolling surface 50 and the transverse beams 52.

Figure 3:
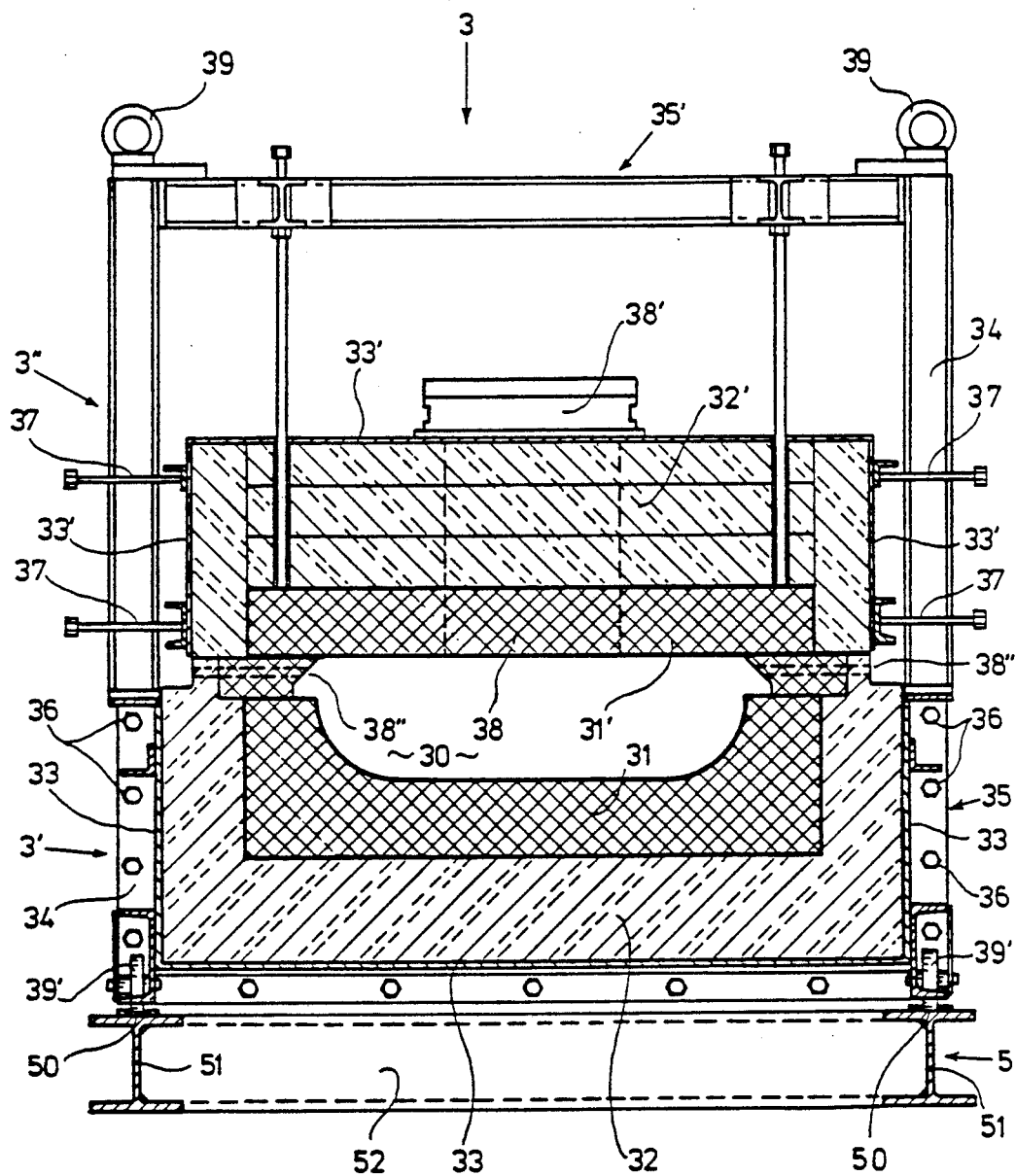
FIG. 3 shows a cross section through the conduit segment taken along line III—III in FIG. 2

FIG. 3 is a cross section through the conduit segment 3 taken along the line III—III in FIG. 2 showing the structure of the conduit segments 3 concerned. It must be noted here that the internal structure of the other conduit segments 2 and 4 are mostly identical unless the immediate connecting area of the glass melt furnace 10 and the glass discharge 11 are concerned.

In the center of the conduit segment 3 a flat hollow space 30 is visible which is formed by a trough 31 and serves to channel the glass melt. The trough, which is made of a fire-proof material, is covered on top by a lid 31'. On the edges between the trough 31 and the trough lid 31', there are small form bodies disposed which are also made of a fire-proof material. Underneath and on the sides of the trough 31 as well as on the sides of the trough lid 31', there are insulations 32 and 32' which are composed of individual form bodies, e.g. a chamotte. Toward the exterior, the insulations 32 and 32' are covered by an external casing 33 and 33', respectively, made of sheet steel. The external casing 33 of the lower part 3' of the conduit segment 3 is dimensioned so as to be relatively stable and included in the lower part 35 of the supporting steel frame 34. In the area of the upper part 3" of the conduit segment 3 there is a free space between the top external casing 33' and the upper part 35' of the frame surrounding this casing. Beams which run longitudinally along the external casing 33' are disposed in the lateral parts of this free space. These beams can be pressed from the exterior toward the interior by means of thrust bolts 37 which are passed through the frame 34. For this purpose, the frame 34 is advantageously provided with threaded boreholes or threaded sleeves which extend in horizontal direction from the exterior toward the interior. The trough cover 31 and the appertaining form body of the insulation 32' are braced with respect to each other by means of the thrust bolts 37 such that they function practically as one piece without any further coupling means.

The clamping bolts 37' which pass downward into the upper part 3" serve to press the trough cover 31' downward toward the trough 31 and to rigidly hold it there between the inserted form bodies. This prevents particularly the individual parts of the upper part 3" and the lower part 3' from sliding or coming loose during transportation of the conduit segment 3, e.g. on a truck.

In order to adjust the compressive force of the thrust bolts 37' the latter can also be attached in threaded boreholes or sleeves in the upper part 35' of the frame 34. At the external end, each thrust and clamping bolt 37 and 37' has a hexagon head for setting a wrench.

One of the cooling apertures the course of which is indicated by a broken line extends through the upper part 3" of the conduit segment 3 from the hollow space 30 for the glass melt to the upper side of the conduit segment 3. As already mentioned, at its upper end the cooling aperture 38 is covered by means of the lid 38' which can be removed whenever necessary.

Lead-in openings 38" for passing through burners, thermoelements and the like are provided in the transitional area between the trough 31 and the trough cover 31', in particular in the smaller form bodies between the latter.

In the bottom part of the longitudinal sides and in the area of the lower part of the conduit segment 3, the front parts of the frame 34, particularly the lower parts 35 thereof, are configured like flanges and provided with regularly spaced-apart boreholes for passing through the coupling agents 36, threaded bolts in this case, which serve to join the segment 3 to the adjacent segment.

Further stopper ears 39 are attached to the upper end of the upper part 35' of the frame 34; at the opposing lower end of the conduit segments 3 there are further rollers 39' attached.

These rollers 39' can move on the rolling surface 50 of the longitudinal beams 51 of the support beam arrangement 5. The transverse beam 52 connects the two longitudinal beams 51 of the support beam arrangement 5 in transverse direction.

Figure 4:
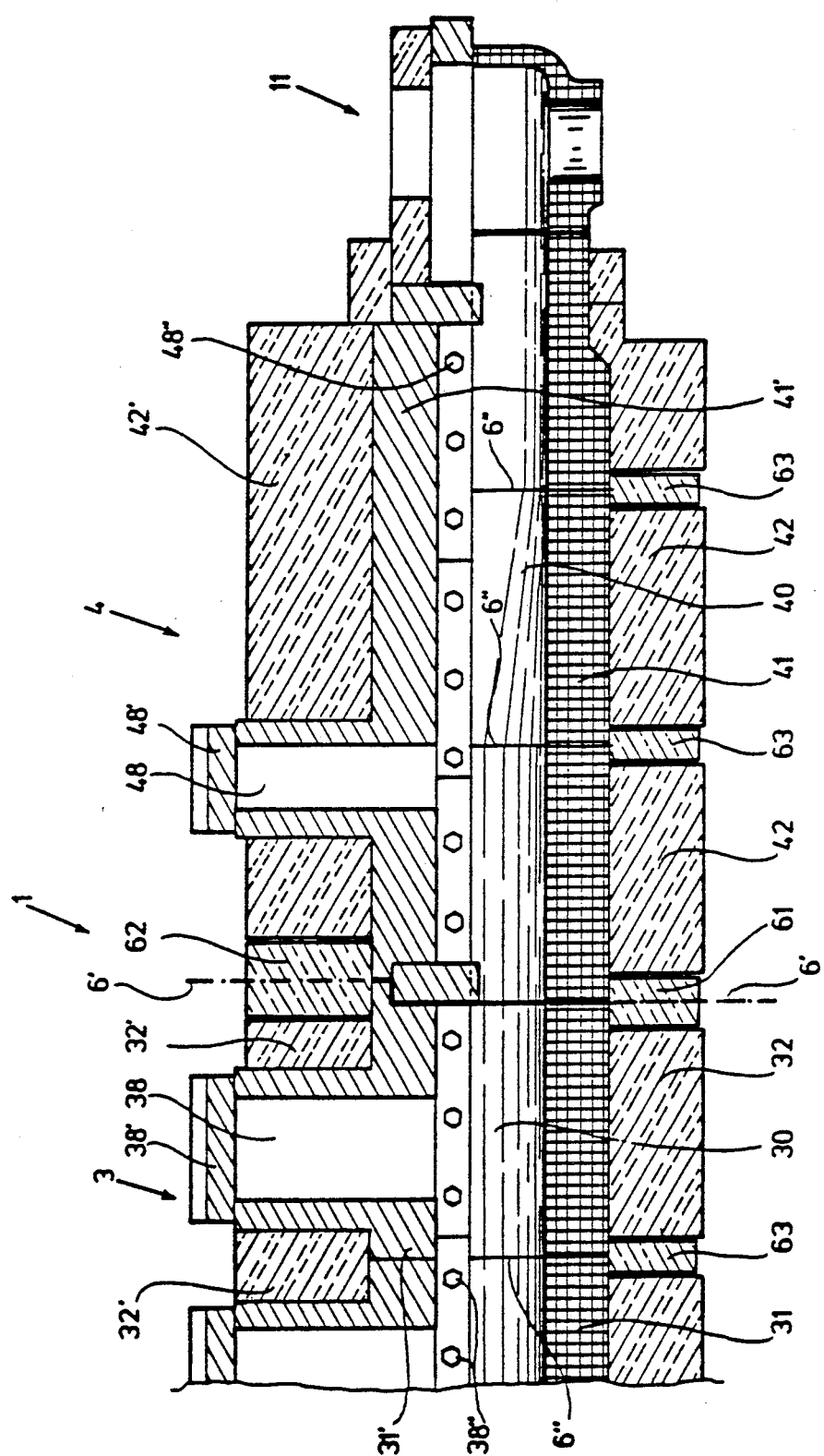
FIG. 4 shows is a longitudinal cross section through the rear of the glass conduit of FIG. 1.

FIG. 4, finally, is a longitudinal partial section in a vertical plane through the glass conduit 1; the section is taken through the conduit segment 4 and through a part of the conduit segment 3. In order to avoid a confusing representation, FIG. 4 does not show frame and casing of the glass conduit 1. As already described, the conduit segments 3 and 4 contact one another along a basically vertical separating plane 6'. The one part of the trough 31 which is located in the conduit segment 3 and the one part of the trough 41 for the glass melt which is located in the conduit segment 4 also contact one another in alignment in plane 6'. The joint resulting in this area following the course of trough is covered toward the bottom by a tamped in insulating mass 61. In the upper part, the joint in the area of the separating plane 6' is also covered by a tamped in insulating mass 62 above the trough covers 31' and 41' which also contact each other. The insulating masses 61 and 62 form a circumferential ring around the trough 31 and 41 and the trough cover 31', 41'. The insulating masses 61 and 62 are supported by the pressure plates 60 (FIG. 1).

The trough in each conduit segment is divided into longitudinal sections which meet at joints 6". In the vicinity of these joints the insulation is formed toward the bottom by a tamped in insulating mass 63. Between the areas where the insulating mass 61, 62, 63 is tamped in, there are the aforesaid insulations 32 and 32' and 42 and 42' which are made of rigid form bodies. The insulating masses 61, 62, and 63 are tamped in preferably after the tempering of the glass conduit 1 such that expansions in the area of vicinity of the joints 6' and 6" cannot affect the tightness and the functioning of the insulating in general. The tamped in joint masses 61, 62, 63 can be easily removed after removal of the corresponding covers and pressure plates in order to carry out inspection and repair work in the area of the separating plane 6' and 6".

Further, FIG. 4 shows parts of the glass conduit 1 described hereinbefore. Both parts of the trough 31 and 41 thus form a continuous hollow space 30, 40 through which flows the glass melt to the glass discharge 11 shown in the right portion of FIG. 4. Above the hollow space 30, 40 there are apertures 38″ and 48″ for the aforementioned elements such as heating elements and the like. Toward the top the trough 31, 41 is defined by the trough cover 31′, 41′. Toward the exterior or the top the latter is followed by the appertaining insulation 32′ and 42′. Following the course of the glass conduit 1 there are several additional cooling apertures 38, 48 each of which is covered by a lid 38′ and 48′.

For reasons of clarity, the present embodiment of the glass conduit 1 comprises only three conduit segments 2, 3, 4. In practice, of course, larger numbers of conduit segments, e.g. four to eight, are possible.

What is claimed is:

1. Conduit for molten glass comprising, successively from the inside toward the outside of the conduit, a trough for channelling the glass melt in a longitudinal direction and a trough cover both of which are made of a fire-proof material, an insulation consisting of individual form bodies, an external casing at least partially surrounding this insulation and a support beam arrangement which supports the conduit at least at the bottom and longitudinally, wherein the conduit comprises a plurality of conduit segments contacting one another along separating planes which run basically vertically and transversely to the longitudinal direction of the conduit, and further comprising coupling means for bracing the conduit segments with respect to one another.

2. Conduit as in claim 1 wherein the first and the last conduit segments are configured as connecting conduit segments specifically designed for furnaces and manufacturing machines and that between the two connecting conduit segments one or several additional intermediate conduit segments are disposed which are at least partially identical to each other.

3. Conduit as in claim 2 wherein the support beam arrangement is configured as a frame construction which surrounds the conduit segments at the top, the bottom and longitudinally, and the coupling means engage opposing frame parts of two respectively adjacent conduit segments.

4. Conduit as in claim 1 wherein each conduit segment is provided with a lower part including the trough, and the appertaining insulation, and the external casing, and is further provided with an upper part including the trough cover, the appertaining insulation, and the external casing, wherein the upper part is braced with respect to itself by means of laterally engaging thrust bolts which are laterally supported at the frame, and with respect to the lower part by means of downwardly engaging clamping bolts which are supported at the top of the frame.

5. Conduit as in claim 1, wherein the external casing and the form bodies are longitudinally recessed from the separating planes, and the the trough and the trough cover of adjacent segments meet at joints along the separating planes, said joints being enclosed toward the exterior by respective rings of tamped in insulating mass, the rings being externally enclosed by respective pressure plates.

6. Conduit as in claim 1 wherein the trough in each segment comprises a plurality of longitudinal sections which meet at joints, the external casing and the form bodies of each conduit segment being interrupted in the area of said joints, the joints each being covered toward the exterior by one layer of tamped in insulating mass, which is externally enclosed by pressure plates.

7. Conduit as in claim 1 wherein each conduit segment is configured so as to be self-supporting and laterally or at its bottom provided with skids or rollers, several conduit segments being successively placed on a common support beam arrangement functioning as a supporting substructure for moving the conduit segments in a horizontal direction.

8. Conduit as in claim 1 wherein at least some of the individual conduit segments are provided with cooling apertures penetrating the upper part and topped with removable lids.

9. Conduit as in claim 1 wherein at least one conduit segment is provided with lateral aperture means penetrating a transitional area between the lower part and the upper part for introducing heating elements, heating electrodes and/or thermoelements.

10. Conduit as in claim 1 wherein each conduit segment is provided at the top of its frame with stopper ears or plates for attaching lifting means.

* * * * *